United States Patent
Morimoto et al.

(10) Patent No.: US 7,014,970 B2
(45) Date of Patent: Mar. 21, 2006

(54) RESIN COMPOSITION

(75) Inventors: Eiji Morimoto, Wakayama (JP); Hidenori Tachi, Wakayama (JP); Katsutoshi Aoki, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/686,618

(22) Filed: Oct. 17, 2003

(65) Prior Publication Data

US 2004/0116621 A1 Jun. 17, 2004

(30) Foreign Application Priority Data

Oct. 18, 2002 (JP) .................................. 2002-304388

(51) Int. Cl.
 *G03G 9/00* (2006.01)
 *C08F 20/00* (2006.01)

(52) U.S. Cl. .................. 430/110; 528/302; 528/308; 528/308.1; 525/437; 525/444; 521/48.5; 430/109

(58) Field of Classification Search ................. 528/302, 528/308, 308.1; 525/437, 444; 521/48.5; 430/109, 110
See application file for complete search history.

(56) References Cited

U.S. PATENT DOCUMENTS 5,660,963 A * 8/1997 Doujo et al. ............. 430/109.4

FOREIGN PATENT DOCUMENTS

| JP | 54-128183 | 10/1979 |
|----|-----------|---------|
| JP | 09-157366 | 6/1997 |

OTHER PUBLICATIONS

Derwent Abstracts, JP 8–239409, Sep. 17, 1996.
Derwent Abstracts, JP 8–253596, Oct. 1, 1996.
Japanese Office Action, mailing date Apr. 6, 2005.

* cited by examiner

*Primary Examiner*—Samuel A. Acquah
(74) *Attorney, Agent, or Firm*—Oblon, Spivak, McClelland, Maier & Neustadt, P.C.

(57) ABSTRACT

A resin composition having a softening point of from 80° to 165° C., obtained by reacting a poly $C_{2-4}$ alkylene terephthalate having a melting point of 200° C. or more with a low-molecular weight polyester having a number-average molecular weight of from 400 to 2500; a resin binder for a toner comprising the above resin composition; a toner comprising the above resin binder; a process for preparing a resin composition having a softening point of from 80° to 165° C., comprising the step of reacting a poly $C_{2-4}$ alkylene terephthalate having a melting point of 200° C. or more with a low-molecular weight polyester having a number-average molecular weight of from 400 to 2500. The resin composition can be suitably used as a resin binder for a toner used for developing electrostatic latent images formed in electrophotography, electrostatic recording method, electrostatic printing, and the like.

18 Claims, No Drawings

RESIN COMPOSITION

FIELD OF THE INVENTION

The present invention relates to a resin composition which can be suitably used as a resin binder for a toner used for developing electrostatic latent images formed in electrophotography, electrostatic recording method, electrostatic printing method, and the like, a resin binder for a toner comprising the resin composition, and a toner comprising the resin binder.

BACKGROUND OF THE INVENTION

Conventionally, there has been known from the viewpoint of the effective utilization of resources to prepare a resin binder for a toner by reacting a polyethylene terephthalate that can be collected for reuse as a raw material with a monomer and/or water, and to prepare a toner comprising the resin binder, which is so-called a "recycled toner" (Japanese Patent Laid-Open Nos. Hei 8-239409 and Hei 8-253596). However, with the urgent demand for high speeds of these days, there has been earnestly desired a toner which is excellent in both durability and fixing ability, which are counteracting properties.

As techniques for satisfying both the durability and the fixing ability, there have been known a toner in which a wax is optimally dispersed in a resin having an island-and-sea structure (Japanese Patent Laid-Open No. 2002-244338); a toner comprising a polyester made from an alcohol component comprising an alkylene oxide adduct of bisphenol A, a releasing agent, a colorant and an external additive (Japanese Patent Laid-Open No. 2000-98661 and Japanese Patent Laid-Open No. 2000-214638 (U.S. Pat. No. 6,106, 986)); a toner comprising a petroleum resin made of a specified aromatic hydrocarbon copolymer (Japanese Patent Laid-Open No. Hei 11-72956 (U.S. Pat. No. 5,958,642)); and the like. Although an effect is obtained to some extent in each of the techniques, a further improvement in the performance is required for a recycling toner.

SUMMARY OF THE INVENTION

According to the present invention, there are provided:
(1) a resin composition having a softening point of from 80° to 165° C., obtained by reacting a poly $C_{2-4}$ alkylene terephthalate having a melting point of 200° C. or more with a low-molecular weight polyester having a number-average molecular weight of from 400 to 2500;
(2) The resin composition according to the above (1), wherein the poly $C_{2-4}$ alkylene terephthalate and the low-molecular weight polyester are reacted concurrently, further with a trivalent or higher polyvalent monomer;
(3) The resin composition according to the above (1), wherein the poly $C_{2-4}$ alkylene terephthalate is reacted with the low-molecular weight polyester, and the resulting product is further reacted with a trivalent or higher polyvalent monomer;
(4) a resin binder for a toner comprising the resin composition as defined in any of the above (1) to (3); and
(5) a toner comprising the resin binder as defined in the above (4).

DETAILED DESCRIPTION OF THE INVENTION

All publications cited herein are hereby incorporated by reference.

The present invention relates to a resin composition which is useful as a resin binder for a toner which is excellent in both the durability and the fixing ability, a resin binder for a toner comprising the resin composition, and a toner comprising the resin binder.

These and other advantages of the present invention will be apparent from the following description.

The resin composition of the present invention is obtained by reacting a high-molecular weight polyalkylene terephthalate (hereinafter simply referred to as "PAT") having a melting point of 200° C. or more with a low-molecular weight polyester. Therefore, the resin composition of the present invention is considered to be a block-type polyester comprising the polyalkylene terephthalate unit and a unit derived from the low-molecular weight polyester as constituting units. Usually, the durability of the resin binder can be improved by increasing its molecular weight, but the fixing ability is lowered in the meantime. Also when the molecular weight is conversely decreased, the durability is lowered. Therefore, in the present invention, since a high-molecular weight PAT is subjected to depolymerization and re-polymerization in the presence of a low-molecular weight polyester, but not in the presence of monomers, the molecular weight distribution of the resin composition can be easily adjusted, so that a resin binder having excellent performance can be obtained. In other words, in the present invention, since a high-molecular weight PAT is reacted with a low-molecular weight polyester, a resin composition containing a smaller amount of high-molecular weight components and a smaller amount of low-molecular weight components can be prepared. Also, since the softening point of the resin composition is controlled to 80° to 165° C., a resin composition which is excellent in both the durability and the fixing ability is obtained.

In the present invention, the PAT has a melting point of 200° C. or more, preferably from 220° to 300° C., from the viewpoint of the durability and the fixing ability.

The PAT includes a PAT of which alkylene group has 2 to 4 carbon atoms, such as polyethylene terephthalate, polypropylene terephthalate and polybutylene terephthalate. In the present invention, there can be used PAT which are produced as an article in the form of a bottle, a film or the like and once discarded or the like, and thereafter collected for reuse. Therefore, among the PATs, polyethylene terephthalate is preferred because of its wide use and of which recycled article is also readily available. Here, the recycled article is not particularly limited to its kinds and the like as long as the recycled article does not contain a compound which would hinder the performance of the toner or the polymerization reaction and has a certain level of purity.

During its use, those pulverized to a flaky form, pellets and the like can be preferably used from the viewpoint of facilitation in handling or dispersion and/or disintegration.

The low-molecular weight polyester is obtained by a known method comprising polycondensing an alcohol component with a carboxylic acid component.

In the present invention, the low-molecular weight polyester has a number-average molecular weight of from 400 to 2500, preferably from 1000 to 2300, more preferably from 1500 to 2000. The number-average molecular weight of the polyester can be adjusted by the ratio of the alcohol component to the carboxylic acid component initially charged, reaction ratio and the like. Especially, a method of adjusting a ratio of the alcohol component to the carboxylic acid component is convenient and preferred. The ratio of the number of carboxyl groups in the carboxylic acid component to the number of hydroxyl group in the alcohol component, i.e. carboxyl group/hydroxyl group, is preferably from 0.9 to 0.4, more preferably from 0.85 to 0.5.

It is preferable that the alcohol component is an aliphatic diol having 2 to 8 carbon atoms, preferably 2 to 6 carbon atoms, from the viewpoint of the adjustment of the softening point.

The aliphatic diol having 2 to 8 carbon atoms includes ethylene glycol, 1,2-propylene glycol, 1,3-propylene glycol, 1,4-butanediol, 1,5-pentanediol, 1,6-hexanediol, neopentyl glycol, 1,4-butenediol, and the like. Among them, ethylene glycol, 1,2-propylene glycol and neopentyl glycol are more preferable.

It is desirable that the aliphatic diol having 2 to 8 carbon atoms is contained in the alcohol component in an amount of preferably from 80% by mol or more, more preferably from 90 to 100% by mol.

Diols other than the aliphatic diol having 2 to 8 carbon atoms include alcohols such as an alkylene (2 to 3 carbon atoms) oxide adduct (average number of moles added being 1 to 16) of bisphenol A, such as polyoxypropylene(2.2)-2, 2-bis(4-hydroxyphenyl)propane and polyoxyethylene(2.2)-2,2-bis(4-hydroxyphenyl)propane, hydrogenated bisphenol A and an alkylene (2 to 3 carbon atoms) oxide adduct (average number of moles added being 1 to 16) thereof.

The dicarboxylic acid compound contained in the carboxylic acid component includes aromatic polycarboxylic acids such as phthalic acid, isophthalic acid and terephthalic acid; aliphatic polycarboxylic acids such as fumaric acid, maleic acid, adipic acid, succinic acid, a substituted succinic acid of which substituent is an alkyl group having 1 to 20 carbon atoms or an alkenyl group having 2 to 20 carbon atoms, such as dodecenylsuccinic acid and octenylsuccinic acid; acid anhydrides thereof; $C_{1-3}$ alkyl esters thereof, and the like. Among them, the aromatic dicarboxylic acid compounds are preferred, and the aromatic dicarboxylic acid compound is contained in the dicarboxylic acid compound in an amount of preferably 80% by mol or more, more preferably 90 to 100% by mol.

Furthermore, the trihydric or higher polyhydric alcohol includes glycerol, sorbitol, 1,4-sorbitan, pentaerythritol, trimethylolpropane and the like. Also, the tricarboxylic or higher polycarboxylic acid compound includes 1,2,4-benzenetricarboxylic acid (trimellitic acid), pyromellitic acid, anhydrides thereof, $C_{1-12}$ alkyl esters thereof, and the like.

The trivalent or higher polyvalent monomer which is selected from the trihydric or higher polyhydric alcohol and the tricarboxylic or higher polycarboxylic acid compound is contained in the raw material monomers of the low-molecular weight polyester in an amount of preferably 5% by mol or less, more preferably 3% by mol or less, even more preferably 0% by mol or less, from the viewpoint of the durability.

The low-molecular weight polyester can be prepared, for instance, by polycondensing an alcohol component and a carboxylic acid component in which the kinds and amounts of the components are selected in consideration of the softening point of the produced resin composition, preferably further in consideration of the glass transition temperature, at a temperature of from 180° to 250° C. in an inert gas atmosphere using an esterification catalyst as occasion demands.

The amount of the low-molecular weight polyester used, as expressed by a weight ratio of the low-molecular weight polyester to the PAT, is preferably from 10/90 to 80/20, more preferably from 20/80 to 60/40.

Further, the present invention provides a resin composition obtained by reacting a PAT with a low-molecular weight polyester and a trivalent or higher polyvalent monomer. By reacting a PAT with a trivalent or higher polyvalent monomer in addition to a low-molecular weight polyester, the durability and the fixing ability are further improved. The method of reacting the PAT, the low-molecular weight polyester and the trivalent or higher polyvalent monomer is not particularly limited. There are the following two embodiments in the method of reacting the PAT, the low-molecular weight polyester and the trivalent or higher polyvalent monomer: (1) an embodiment in which the poly $C_{2-4}$ alkylene terephthalate and the low-molecular weight polyester are reacted concurrently, further with a trivalent or higher polyvalent monomer; and (2) an embodiment in which the poly $C_{2-4}$ alkylene terephthalate is reacted with the low-molecular weight polyester, and the resulting product is further reacted with a trivalent or higher polyvalent monomer. Among them, the method (2) is preferred in the present invention. Therefore, the resin composition is considered to be a block-type polyester comprising a polyalkylene terephthalate unit, a unit derived from a low-molecular weight polyester and a trivalent or higher polyvalent monomer unit as constituting units. According to this method, the trivalent or higher polyvalent monomer is reacted as a cross-linking agent with a block polymer obtained by the reaction of the PAT with the low-molecular weight polyester. Therefore, the amount of the low-molecular weight component can be efficiently reduced, and a resin composition having a desired softening point can be readily prepared. As the trivalent or higher polyvalent monomer, the same ones as those exemplified as the raw material monomer for the low-molecular weight polyester can be used.

The trivalent or higher polyvalent monomer may be any of alcohols and carboxylic acid compounds. The tricarboxylic acid or higher polycarboxylic acid compound is preferred from the viewpoints of the reactivity and the adjustment of the softening point. In the present invention, the tricarboxylic acid or higher polycarboxylic acid compound includes not only the polycarboxylic acids but also acid anhydrides thereof, $C_{1-3}$ alkyl esters of these acids, and the like. In the present invention, the polycarboxylic acid is preferred.

From the viewpoints of adjustments of the softening point, the glass transition temperature and the low-molecular weight component, the amount of the trivalent or higher polyvalent monomer is as follows. In the case where the trivalent or higher polyvalent monomer is a trihydric or higher polyhydric alcohol, the amount of the trihydric or higher polyhydric alcohol is preferably from 1 to 30 mol, more preferably from 5 to 25 mol per 100 mol of the alcohol component forming the resin composition. In the case where the trivalent or higher polyvalent monomer is a tricarboxylic or higher polycarboxylic acid compound, the amount of the tricarboxylic or higher polycarboxylic acid compound is preferably from 1 to 30 mol, more preferably from 5 to 25 mol per 100 mol of the carboxylic acid component forming the resin composition. Here, the alcohol component forming the resin composition means a total amount of the alcohol component used as the raw material monomer for the low-molecular weight polyester and the alcohol component such as a polyalkylene alcohol used as the raw material monomer for the PAT. Likewise, the carboxylic acid component forming the resin composition means a total amount of the carboxylic acid component used as the raw material monomer for the low-molecular weight polyester and the carboxylic acid component such as terephthalic acid used as the raw material monomer for the PAT.

The reaction conditions such as reaction temperatures and reaction pressure during the reaction of the PAT with the polyester and/or the trivalent or higher polyvalent monomer can be adjusted in the same manner as those in the preparation of the condensation resin such as a polyester.

The resin composition of the present invention obtained by reacting the PAT with the low-molecular weight polyester and optionally further with the trivalent or higher polyvalent monomer has a softening point of from 80° to 165° C., preferably from 120° to 160° C., more preferably from 140° to 160° C., and a glass transition temperature of preferably from 50° to 85° C., more preferably from 65° to 75° C., even more preferably from 60° to 75° C. The content of the low-molecular weight component having a molecular weight of 500 or less is preferably 4% or less, more preferably from 1 to 3.5%, even more preferably from 1.5 to 2.5%.

The resin composition of the present invention can be preferably used as a resin binder for a toner. The present invention also provides a toner comprising a resin binder comprising the resin composition.

The resin binder comprises the resin composition of the present invention, and may contain a polyester, a styrene-acrylic resin, a mixed resin of the polyester and the styrene-acrylic resin, an epoxy resin or the like within the range which would not impair the effects of the present invention. The resin composition of the present invention is contained in the resin binder in an amount of preferably from 50 to 100% by weight, more preferably from 80 to 100% by weight, even more preferably 100% by weight.

The toner of the present invention may further contain an additive such as a colorant, a charge control agent, a releasing agent, an electric conductivity modifier, an extender, a reinforcing filler such as a fibrous substance, an antioxidant, an anti-aging agent, a fluidity improver, and a cleanability improver in a proper amount.

As the colorant, all of the dyes and pigments which are used as colorants for a toner can be used, and the colorant includes carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazoyellow, and the like. These colorants can be used alone or in admixture of two or more kinds. The toner of the present invention can be used as any of black toners, color toners, and full color toners. The colorant is contained in the resin binder in an amount of preferably from 1 to 40 parts by weight, more preferably from 3 to 10 parts by weight, based on 100 parts by weight of the resin binder.

The charge control agent includes positively chargeable charge control agents such as Nigrosine dyes, triphenylmethane-based dyes containing a tertiary amine as a side chain, quaternary ammonium salt compounds, polyamine resins and imidazole derivatives, and negatively chargeable charge control agents such as metal-containing azo dyes, copper phthalocyanine dyes, metal complexes of alkyl derivatives of salicylic acid and boron complexes of benzilic acid.

The releasing agent includes waxes such as natural ester waxes such as carnauba wax and rice wax; synthetic waxes such as polypropylene wax, polyethylene wax and Fischer-Tropsch wax; coal waxes such as montan wax; and alcohol waxes. These waxes may be contained alone or in admixture of two or more kinds.

The toner of the present invention may be prepared by any of conventionally known methods such as the kneading and pulverization method. In the case of a pulverized toner obtained by the kneading and pulverizing method, the toner can be prepared by homogeneously mixing a resin binder, a colorant and the like with a mixer such as a Henschel mixer or a ball-mixer, thereafter melt-kneading with a closed kneader, a single-screw or twin-screw extruder, or the like, cooling and pulverizing a kneaded mixture, and classifying the resulting powder. The toner has a volume-average particle size of preferably from 3 to 15 $\mu$m.

The toner of the present invention can be used alone as a developer, in a case where the fine magnetic material powder is contained. Alternatively, in a case where the fine magnetic material powder is not contained, the toner can be used as a nonmagnetic monocomponent developer, or the toner can be mixed with a carrier and used as a two-component developer. It is preferable to use the toner of the present invention as a two-component developer from the viewpoint of excellent durability.

EXAMPLES

The following examples further describe and demonstrate embodiments of the present invention. The examples are given solely for the purposes of illustration and are not to be construed as limitations of the present invention.

[Softening Point]

The softening point refers to a temperature at which a half of the resin flows out, when measured by using the flow tester of "koka" type, "CAPILLARY RHEOMETER CFT-500D" (commercially available from Shimadzu Corporation) (sample: 1 g, rate of raising temperature: 6° C./min, load: 1.96 MPa, and nozzle: $\phi$ 1 mm×1 mm).

[Glass Transition Temperature and Melting Point]

The glass transition temperature or melting point is determined by using a differential scanning calorimeter "DSC 210" (commercially available from Seiko Instruments, Inc.) with raising the temperature at a rate of 10° C./min.

[Number-Average Molecular Weight and Content of Low-Molecular Weight Components Having Molecular Weight of 500 or Less]

The molecular weight distribution is determined according to gel permeation chromatography (GPC).

A sample is dissolved in tetrahydrofuran (THF) so as to have a concentration of 0.5% by weight. Next, this solution was filtered with a fluororesin filter (DISMIC-25-JP, commercially available from Toyo Roshi Kaisha, Ltd. having a pore size of 0.2 $\mu$m) to exclude an insoluble component, to give a sample solution.

THF is eluted as an eluate at a flow rate of 1 ml per minute, and the column was stabilized in a thermostat at 40° C. One-hundred microliters of the sample solution is injected to the column to determine the molecular weight distribution. The molecular weight of the sample is calculated on the basis of a calibration curve previously prepared. The content of the component having a molecular weight of 500 or less is calculated as % by area of the corresponding region of the chart obtained by an RI (refractive index) detector. As the analysis column, "GMHXL+G3000HXL" (commercially available from Tosoh Corporation) was used. The calibration curve of the molecular weight is one prepared by using several kinds of monodisperse polystyrenes as standard samples.

Examples 1-A, 2-A, 2-B and 3-A and Comparative Example 1-c

A 5-liter four-neck flask equipped with a dehydration tube equipped with a rectifying tower, a nitrogen inlet tube, a stirrer and a thermocouple was charged with raw material monomers for a low-molecular weight polyester shown in Tables 1 to 3 and 10 parts by weight of monobutyltin oxide. Here, a hot water at 95° C. was allowed to flow through the rectifying tower. The mixture was reacted with heating from 185° to 230° C. over a period of about 8 hours, and further reacted under the reduced pressure of 52 kPa for 1 hour, to give a low-molecular weight polyester.

In Comparative Example 1-c, the reaction was stopped during the course of the reaction due to the unreacted terephthalic acid remaining in the reaction mixture.

Next, a flaky polyethylene terephthalate (PET, melting point: 256° C.) was added to the resulting low-molecular weight polyester in an amount shown in each of Tables 1 to 3, and the mixture was reacted at 225° C. for 4 hour, to give a block polymer of PET and low-molecular weight polyester.

Further, trimellitic anhydride was added to the resulting block polymer in an amount shown in each of Tables 1 to 3, and the mixture was reacted until a desired softening point was attained under the conditions of 210° to 220° C. and 27 kPa, to give a resin composition.

In each of Examples and Comparative Examples, the raw material monomer for a low-molecular weight polyester and trimellitic acid used as a trivalent or higher polyvalent monomer are used such that the ratio of the number of hydroxyl groups in an alcohol to the number of carboxyl groups in a carboxylic acid and trimellitic anhydride is adjusted to 1.0.

Comparative Examples 1-b, 2-c and 3-b

Cases of Directly Reacting the Raw Material Monomers for a Low-Molecular Weight Polyester with PET A 5-liter four-neck flask equipped with a dehydration tube equipped with a rectifying tower, a nitrogen inlet tube, a stirrer and a thermocouple was charged with ethylene glycol and neopentyl glycol of the raw material monomers for a low-molecular weight polyester shown in Tables 1 to 3 and 10 parts by weight of dibutyltin oxide. Here, a hot water at 95° C. was allowed to flow through the rectifying tower. Thereafter, PET was added thereto at 80° to 210° C. in divided portions in an amount shown in each of Tables 1 to 3, and terephthalic acid was further added thereto in an amount shown in each of Tables 1 to 3. The mixture was reacted with heating from 185° to 230° C. over a period of about 8 hours, and further reacted under the reduced pressure of 52 kPa for 1 hour, to give an intermediate product.

Next, trimellitic anhydride was added to the intermediate product in an amount shown in each of Table 1 to 3, and the mixture was reacted until a desired softening point was attained under the conditions of 210° to 220° C. and 27 kPa, to give a resin composition.

Comparative Examples 1-d, 2-d, 3-c and 3-d

Cases of Preparing Resin Compositions Entirely from Monomers

A 5-liter four-neck flask equipped with a dehydration tube equipped with a rectifying tower, a nitrogen inlet tube, a stirrer and a thermocouple was charged with raw material monomers for a low-molecular weight polyester shown in each of Tables 1 to 3 and 10 parts by weight of dibutyltin oxide. Here, a hot water at 95° C. was allowed to flow through the rectifying tower. The mixture was reacted with heating from 185° to 230° C. over a period of about 8 hours, and further reacted under the reduced pressure of 52 kPa for 1 hour. Thereafter, trimellitic anhydride in an amount shown in each of Tables 1 to 3 was added thereto, and the mixture was reacted until a desired softening point was attained under the conditions of 210° to 220° C. and 27 kPa, to give a resin composition.

In Comparative Example 3-d, after the softening point was attained to 152° C. in Comparative Example 3-c, the reaction mixture was reacted for additional 0.5 hours in order to reduce the low-molecular weight product. However, gelation of the resin was generated during the reaction, thereby making it impossible to take out the resin from the flask.

TABLE 1

|  | Ex. 1-A | Comp. Ex. 1-b | Comp. Ex. 1-c | Comp. Ex. 1-d |
|---|---|---|---|---|
| Raw Material Monomers of Low-Molecular Weight Polyester |  |  |  |  |
| Ethylene Glycol | 14 (1) | 14 (1) | 14 (1) | 727 (51) |
| Neopentyl Glycol | 1172 (49) | 1172 (49) | 1172 (49) | 1172 (49) |
| Terephthalic Acid | 1508 (39.5) | 1508 (39.5) | 1909 (50) | 3417 (89.5) |
| Number-Average Molecular Weight of Low-Molecular Weight Polyester | 1826 | — | 2667 | — |
| Polyethylene Terephthalate (PET) | 2208 (50) | 2208 (50) | 2208 (50) | 0 (0) |
| Trimellitic Anhydride | 309 (7) | 309 (7) | 0 (0) | 309 (7) |
| Properties of Resin |  |  |  |  |
| Softening Point (° C.) | 152.4 | 158.0 | — | 147.3 |
| Glass Transition Temperature (° C.) | 70.2 | 69.6 | — | 70.2 |
| Content (%) of Low-Molecular Weight (500 or Less) Component | 1.91 | 3.03 | — | 3.36 |

TABLE 1-continued

|  | Ex. 1-A | Comp. Ex. 1-b | Comp. Ex. 1-c | Comp. Ex. 1-d |
|---|---|---|---|---|

Note:
The amounts used are expressed by parts by weight, and the numerical values inside the parentheses are molar ratio.
The amount of PET used was calculated by defining a unit of [terephthalic acid-ethylene glycol] as one mol.

TABLE 2

|  | Ex. 2-A | Ex. 2-B | Comp. Ex. 2-c | Comp. Ex. 2-d |
|---|---|---|---|---|
| Raw Material Monomers of Low-Molecular Weight Polyester |  |  |  |  |
| Ethylene Glycol | 14 (1) | 300 (21) | 14 (1) | 727 (51) |
| Propylene Glycol | 857 (49) | 857 (49) | 857 (49) | 857 (49) |
| Terephthalic Acid | 1050 (27.5) | 1814 (47.5) | 1050 (27.5) | 2959 (77.5) |
| Number-Average Molecular Weight of Low-Molecular Weight Polyester | 615 | 927 | — | — |
| Polyethylene Terephthalate (PET) | 2208 (50) | 1325 (30) | 2208 (50) | 0 (0) |
| Trimellitic Anhydride | 662 (15) | 662 (15) | 662 (15) | 662 (15) |
| Properties of Resin |  |  |  |  |
| Softening Point (° C.) | 153.5 | 153.1 | 150.1 | 152.4 |
| Glass Transition Temperature (° C.) | 68.8 | 69.1 | 69.0 | 69.5 |
| Content (%) of Low-Molecular Weight (500 or Less) Component | 3.06 | 3.40 | 4.19 | 4.27 |

Note:
The amounts used are expressed by parts by weight, and the numerical values inside the parentheses are molar ratio.
The amount of PET used was calculated by defining a unit of [terephthalic acid-ethylene glycol] as one mol.

TABLE 3

|  | Ex. 3-A | Comp. Ex. 3-b | Comp. Ex. 3-c | Comp. Ex. 3-d |
|---|---|---|---|---|
| Raw Material Monomers of Low-Molecular Weight Polyester |  |  |  |  |
| Ethylene Glycol | 157 (11) | 157 (11) | 727 (51) | 727 (51) |
| Neopentyl Glycol | 1172 (49) | 1172 (49) | 1172 (49) | 1172 (49) |
| Terephthalic Acid | 1145 (30) | 1145 (30) | 2673 (70) | 2673 (70) |
| Number-Average Molecular Weight of Low-Molecular Weight Polyester | 550 | — | — | — |
| Polyethylene Terephthalate (PET) | 1766 (40) | 1766 (40) | 0 (0) | 0 (0) |
| Trimellitic Anhydride | 883 (20) | 883 (20) | 883 (20) | 883 (20) |
| Properties of Resin |  |  |  |  |
| Softening Point (° C.) | 149.4 | 147.9 | 152.2 | — |
| Glass Transition Temperature (° C.) | 68.5 | 68.7 | 70.6 | — |
| Content (%) of Low-Molecular Weight (500 or Less) Component | 3.58 | 4.31 | 4.58 | — |

Note:
The amounts used are expressed by parts by weight, and the numerical values inside the parentheses are molar ratio.
The amount of PET used was calculated by defining a unit of [terephthalic acid-ethylene glycol] as one mol.

Test Example 1

One-hundred parts by weight of the resin binder obtained in each of Examples and Comparative Examples, 7 parts by weight of a carbon black "R330R" (commercially available from Cabot Corporation), 1 part by weight of a negatively charge control agent "BONTRON S-34" (commercially available from Orient Chemical Co., Ltd.) and 1 part by weight of a polypropylene wax "NP-055" (commercially available from Mitsui Chemicals Inc.) were thoroughly mixed with a Henschel Mixer, and thereafter the mixture was melt-kneaded with a twin-screw kneader. The resulting kneaded mixture was cooled and roughly pulverized, and thereafter finely pulverized with a jet mill and classified, to give a powder having a volume-average particle size of 10 $\mu$m. The amount 0.3 part by weight of a hydrophobic silica "TS-530" (commercially available from Cabot Corporation) was added as an external additive to 100 parts by weight of the resulting powder, and mixed with a Henschel mixer, to give a toner.

Thirty-nine parts by weight of the resulting toner and 1261 parts by weight of a ferrite carrier (average particle size: 100 $\mu$m) having saturation magnetization of 70 Am$^2$/kg and being coated with a silicone resin were mixed with a Nauta Mixer, to give each of two-component developers.

Each of the two-component developers was loaded to a modified apparatus of a copy machine "AR-505" (commercially available from Sharp Corporation) (printing speed: 120 ppm, resolution: 600 dpi, development system: 1 magnet roller and organic photoconductor, reversal development, contact development method, fixing temperature: 170° C.). A 500000-sheet continuous printing was carried out by printing a printed pattern having a 20% blackened ratio on A4 size (210 mm×297 mm) cut sheets. Here, when the developer was supplied during the continuous printing, the same developer as that firstly loaded was used. The durability was evaluated in accordance with the following method. Also, the triboelectric charge was also determined in accordance with the following method. The results are shown in Table 4.

(1) Evaluation of Durability

The durability is evaluated by counting the number of sheets in which filming is generated, which is defined as the number of sheets in which white spots are generated in the printed solid image portions as a result of filming of the toner on the photoconductor during the continuous printing.

(2) Determination of Triboelectric Charges

The triboelectric charges at the initial stage of printing and at life-end (after printing 500000 sheets) (except for those cases where filming is generated during the continuous printing, the triboelectric charge at life-end is defined at the point of generation) are measured by using a q/m meter (commercially available from Epping GmbH). Specifically, a specified amount of a developer is supplied in a cell provided in the q/m meter, and only toner is aspirated for 90 seconds through a stainless steel sieve having a sieve opening of 32 $\mu$m (soft blow, blow pressure: 1050 V, aspiration time: 90 seconds). The voltage change generated on the carrier at this time is monitored, and the value of [Total Triboelectric Charges After 90 Seconds ($\mu$C)/Amount of Toner Aspirated (g)] is defined as the triboelectric charge ($\mu$C/g).

(3) Evaluation of Fixing Ability

A sand-rubber eraser to which a load of 500 g was applied, the eraser having a bottom area of 15 mm×7.5 mm, is moved backward and forward five times over a fixed image obtained at the initial stage. The optical reflective density of the image before or after the eraser treatment is measured with a reflective densitometer "RD-915" (manufactured by Macbeth Process Measurements Co.).

As a result, all toners using any of the resin compositions obtained in Examples and Comparative Examples showed a ratio of the optical reflective density after the eraser treatment to that before the eraser treatment of 90% or more, thereby exhibiting excellent fixing ability.

TABLE 4

| | Durability (Absence or Presence of Generation of Filming) | Triboelectric Charges ($\mu$C/g) | | |
|---|---|---|---|---|
| | | Initial | Life-End | Difference |
| Ex. 1-A | None | −22.0 | −22.0 | 0 |
| Comp. Ex. 1-b | Generated at 390,000 sheets | −22.7 | −18.4 | 4.3 |
| Comp. Ex. 1-d | Generated at 330,000 sheets | −22.4 | −17.5 | 4.9 |
| Ex. 2-A | None | −21.9 | −21.3 | 0.6 |
| Ex. 2-B | None | −23.2 | −21.3 | 1.9 |
| Comp. Ex. 2-c | Generated at 280,000 sheets | −23.1 | −18.1 | 5.0 |
| Comp. Ex. 2-d | Generated at 220,000 sheets | −23.6 | −17.2 | 6.4 |
| Ex. 3-A | None | −23.8 | −21.7 | 2.1 |
| Comp. Ex. 3-b | Generated at 120,000 sheets | −22.5 | −15.3 | 7.2 |
| Comp. Ex. 3-c | Generated at 90,000 sheets | −22.8 | −14.8 | 8.0 |

It can be seen from the above results that in the cases where the resin compositions of Examples obtained by reacting PET and the low-molecular weight polyester are used, the fluctuations in triboelectric charges are small and little filming is generated during the continuous printing, and the fixing ability is also excellent. Especially, even in the case of using the resin composition of Example 3-A, in which a large content of the trivalent monomer (trimellitic anhydride) is used, so that a larger amount of residual monomers is contained as compared to that of Comparative Examples 1-d, interestingly no filming is generated. This is presumably due to the dramatic improvement in the durability of the toner as compared to that of the conventional resin by the bonding of the block polymers themselves.

On the other hand, in cases of using the resin compositions of Comparative Examples 1-b, 2-c and 3-b where the raw material monomers for the low-molecular weight polyester are directly reacted with PET and the cases of using the resin compositions of Comparative Examples 1-d, 2-d, 3-c and 3-d where the resin compositions are prepared entirely from the monomers, it can be seen that the fluctuations in the triboelectric charges are large, and the filming is generated.

According to the present invention, there can be provided a resin composition which is useful as a resin binder for a toner having both excellent durability and fixing ability, a resin binder for a toner comprising the resin composition and a toner comprising the resin binder.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A resin composition having a softening point of from 80° to 165° C., obtained by reacting a poly $C_{2-4}$ alkylene terephthalate having a melting point of 200° C. or more with a low-molecular weight polyester having a number-average molecular weight of from 400 to 2500.

2. The resin composition according to claim 1, wherein the poly $C_{2-4}$ alkylene terephthalate and the low-molecular weight polyester are reacted concurrently, further with a trivalent or higher polyvalent monomer.

3. The resin composition according to claim 1, wherein the poly $C_{2-4}$ alkylene terephthalate is reacted with the low-molecular weight polyester, and the resulting product is further reacted with a trivalent or higher polyvalent monomer.

4. The resin composition according to claim 1, wherein the poly $C_{2-4}$ alkylene terephthalate is polyethylene terephthalate that is collected for reuse.

5. The resin composition according to claim 1, wherein the low-molecular weight polyester is obtained by polycondensing a carboxylic acid component and an alcohol component, wherein a ratio of the number of carboxyl groups in the carboxylic acid component to the number of hydroxyl group in the alcohol component, i.e. carboxyl group/hydroxyl group, is from 0.9 to 0.4.

6. The resin composition according to claim 1, wherein a weight ratio of the low-molecular weight polyester to the poly $C_{2-4}$ alkylene terephthalate is from 10/90 to 80/20.

7. The resin composition according to claim 1, wherein a low-molecular component having a molecular weight of 500 or less is contained in the resin composition in an amount of 4% or less.

8. The resin composition according to claim 2 or 3, wherein the trivalent or higher polyvalent monomer is a trihydric or higher polyhydric alcohol, which is used in an amount of from 1 to 20 mol per 100 mol of the alcohol component forming the resin composition.

9. The resin composition according to claim 2 or 3, wherein the trivalent or higher polyvalent monomer is a tricarboxylic or higher polycarboxylic acid compound, which is used in an amount of from 1 to 30 mol per 100 mol of the carboxylic acid component forming the resin composition.

10. The resin composition according to claim 1, wherein the low-molecular weight polyester is obtained by polycondensing an alcohol component comprising 80% by mol or more of an aliphatic diol having 2 to 8 carbon atoms with a carboxylic acid component.

11. The resin composition according to claim 1, wherein the carboxylic acid component comprises a dicarboxylic acid compound, wherein an aromatic dicarboxylic acid compound is contained in the dicarboxylic acid compound in an amount of 80% by mol or more.

12. The resin composition according to claim 10, wherein a trivalent or higher polyvalent monomer is contained in an amount of 5% by mol or less of the entire raw material monomer.

13. A resin binder for a toner comprising the resin composition as defined in claim 1.

14. The resin binder according to claim 13, wherein the resin composition is contained in an amount of from 50 to 100% by weight.

15. A toner comprising the resin binder as defined in claim 13.

16. A process for preparing a resin composition having a softening point of from 80° to 165° C., comprising the step of reacting a poly $C_{2-4}$ alkylene terephthalate having a melting point of 200° C. or more with a low-molecular weight polyester having a number-average molecular weight of from 400 to 2500.

17. The process according to claim 16, wherein the poly $C_{2-4}$ alkylene terephthalate and the low-molecular weight polyester are reacted concurrently, further with a trivalent or higher polyvalent monomer.

18. The process according to claim 16, wherein the poly $C_{2-4}$ alkylene terephthalate is reacted with the low-molecular weight polyester, and the resulting product is further reacted with a trivalent or higher polyvalent monomer.

* * * * *